United States Patent
Bayer et al.

(10) Patent No.: US 11,888,797 B2
(45) Date of Patent: *Jan. 30, 2024

(54) EMOJI-FIRST MESSAGING

(71) Applicant: Snap Inc., Santa Monica, CA (US)

(72) Inventors: Karl Bayer, Brooklyn, NY (US);
Prerna Chikersal, Pittsburgh, PA (US);
Shree K. Nayar, New York, NY (US);
Brian Anthony Smith, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/234,884

(22) Filed: Apr. 20, 2021

(65) Prior Publication Data

US 2022/0337540 A1 Oct. 20, 2022

(51) Int. Cl.
*H04L 51/08* (2022.01)
*H04L 51/224* (2022.01)

(52) U.S. Cl.
CPC ............ *H04L 51/08* (2013.01); *H04L 51/224* (2022.05)

(58) Field of Classification Search
CPC ..... H04L 51/08; H04L 51/24; H04L 67/1097; H04L 51/224; H04L 51/04; H04L 12/1813; H04L 65/403; H04L 41/5093; H04L 51/048; H04L 41/026; G06F 30/0633; G06F 17/276; G06F 16/9535; G06F 3/0237; G06F 40/40; G06F 3/0236; G06F 3/0481; G06F 3/0482
See application file for complete search history.

(56) References Cited

U.S. PATENT DOCUMENTS

| | | | | |
|---|---|---|---|---|
| 6,990,452 B1 * | 1/2006 | Ostermann | .......... | G06Q 10/107 704/260 |
| 8,332,756 B2 * | 12/2012 | Kuhl | .................... | G06F 3/0481 715/705 |
| 8,584,031 B2 * | 11/2013 | Moore | ................ | G06F 3/04817 715/773 |
| 8,918,339 B2 * | 12/2014 | Rubinstein | ............. | G06Q 10/10 715/977 |

(Continued)

FOREIGN PATENT DOCUMENTS

| | | |
|---|---|---|
| KR | 1020170074140 A | 6/2017 |
| WO | 2018053594 A1 | 3/2018 |

OTHER PUBLICATIONS

Broussard, Mitchel: Messages in iOS 10: How to Use Emoji Replacement and Prediction, MacRumors, Sep. 13, 2016 [retrieved on Jul. 7, 2022], Retrieved from the Internet.

(Continued)

*Primary Examiner* — Sargon N Nano
(74) *Attorney, Agent, or Firm* — Culhane Meadows PLLC; Stephen J. Weed (57) ABSTRACT

Emoji-first messaging where text messaging is automatically converted to emojis by an emoji-first application so that only emojis are communicated from one client device to another client device. Each client device has a library of emojis that are mapped to words, which libraries are customizable and unique to the users of the client devices, such that the users can communicate secretly in code. Upon receipt of a string of emojis, a user can select the emoji string to convert to text if desired, for a predetermined period of time.

7 Claims, 7 Drawing Sheets

(56) References Cited

U.S. PATENT DOCUMENTS

| | | | | |
|---|---|---|---|---|
| 9,372,608 | B2* | 6/2016 | Leydon | H04W 4/18 |
| 9,794,202 | B1* | 10/2017 | Pereira | G06F 40/129 |
| 10,084,738 | B2* | 9/2018 | Venkatakrishnan | |
| | | | | G01D 5/24471 |
| 10,169,566 | B1* | 1/2019 | Mossoba | G06F 40/12 |
| 10,482,163 | B2* | 11/2019 | Hullette | G06Q 50/01 |
| 10,515,464 | B2* | 12/2019 | Stukalov | G06T 11/001 |
| 10,521,091 | B2* | 12/2019 | Anzures | G06F 3/0484 |
| 10,529,030 | B2* | 1/2020 | Kataria | G06Q 10/06398 |
| 10,749,818 | B1* | 8/2020 | Bikumala | G06F 40/20 |
| 10,771,419 | B2* | 9/2020 | Charignon | H04L 67/535 |
| 10,877,629 | B2* | 12/2020 | Tung | G06F 16/29 |
| 10,922,487 | B2* | 2/2021 | Patel | G06F 40/274 |
| 10,997,768 | B2* | 5/2021 | Barlier | G06V 40/166 |
| 11,159,458 | B1 | 10/2021 | Johnson et al. | |
| 11,531,406 | B2 | 12/2022 | Bayer et al. | |
| 11,593,548 | B2 | 2/2023 | Bayer et al. | |
| 11,626,368 | B2* | 4/2023 | Chang | H01L 23/5256 |
| | | | | 257/529 |
| 2005/0156873 | A1* | 7/2005 | Walter | H04L 51/04 |
| | | | | 345/156 |
| 2005/0181777 | A1* | 8/2005 | Kim | G06F 3/0236 |
| | | | | 455/418 |
| 2008/0070605 | A1* | 3/2008 | Kim | H04M 1/72436 |
| | | | | 455/466 |
| 2008/0216022 | A1* | 9/2008 | Lorch | G06F 3/04817 |
| | | | | 715/847 |
| 2008/0244446 | A1* | 10/2008 | LeFevre | G06F 3/0236 |
| | | | | 715/810 |
| 2009/0019117 | A1* | 1/2009 | Bonforte | G06Q 10/107 |
| | | | | 709/206 |
| 2010/0123724 | A1* | 5/2010 | Moore | G06F 3/0236 |
| | | | | 345/173 |
| 2010/0125811 | A1* | 5/2010 | Moore | H04M 1/7243 |
| | | | | 715/846 |
| 2010/0179991 | A1* | 7/2010 | Lorch | H04L 51/10 |
| | | | | 715/810 |
| 2013/0147933 | A1* | 6/2013 | Kulas | H04N 21/8153 |
| | | | | 348/61 |
| 2014/0161356 | A1* | 6/2014 | Tesch | G06K 9/00 |
| | | | | 382/196 |
| 2014/0361974 | A1* | 12/2014 | Li | G06F 3/0304 |
| | | | | 345/156 |
| 2015/0100537 | A1* | 4/2015 | Grieves | G06N 5/02 |
| | | | | 706/52 |
| 2015/0133176 | A1* | 5/2015 | Blount | H04W 4/12 |
| | | | | 455/466 |
| 2016/0259502 | A1* | 9/2016 | Parrott | G06F 3/04817 |
| 2017/0083174 | A1* | 3/2017 | Tobens, III | G06F 3/0485 |
| 2017/0083493 | A1* | 3/2017 | Kumhyr | H04L 51/10 |
| 2017/0083506 | A1 | 3/2017 | Liu et al. | |
| 2017/0098122 | A1* | 4/2017 | el Kaliouby | A61B 5/165 |
| 2017/0118189 | A1 | 4/2017 | Venkatakrishnan et al. | |
| 2017/0185580 | A1* | 6/2017 | Zhang | G06T 11/00 |
| 2017/0185581 | A1* | 6/2017 | Bojja | G06V 30/19173 |
| 2017/0222961 | A1* | 8/2017 | Beach | H04L 51/224 |
| 2017/0249291 | A1 | 8/2017 | Patel | |
| 2017/0308290 | A1* | 10/2017 | Patel | G06F 3/04817 |
| 2017/0336926 | A1 | 11/2017 | Chaudhri et al. | |
| 2017/0344224 | A1 | 11/2017 | Kay et al. | |
| 2018/0026925 | A1 | 1/2018 | Kennedy | |
| 2018/0059885 | A1* | 3/2018 | Gonnen | G06F 3/04883 |
| 2018/0173692 | A1 | 6/2018 | Greenberg et al. | |
| 2018/0260385 | A1* | 9/2018 | Fan | G06F 40/274 |
| 2018/0295072 | A1* | 10/2018 | Yim | G06F 3/04817 |
| 2018/0335927 | A1 | 11/2018 | Anzures et al. | |
| 2019/0005070 | A1 | 1/2019 | Li et al. | |
| 2019/0065446 | A1* | 2/2019 | Kota | G06F 40/151 |
| 2019/0073801 | A1* | 3/2019 | Stukalov | H04L 51/10 |
| 2019/0122403 | A1 | 4/2019 | Woo et al. | |
| 2019/0197102 | A1* | 6/2019 | Lerner | G06F 3/04817 |
| 2019/0221208 | A1* | 7/2019 | Chen | G06F 3/167 |
| 2019/0250813 | A1 | 8/2019 | Block et al. | |
| 2019/0379618 | A1 | 12/2019 | Rabbat et al. | |
| 2020/0110794 | A1 | 4/2020 | Vos et al. | |
| 2020/0137004 | A1 | 4/2020 | Yu et al. | |
| 2020/0151220 | A1* | 5/2020 | Cromack | G06F 16/90348 |
| 2020/0210990 | A1* | 7/2020 | Laracey | G06Q 20/4015 |
| 2020/0219295 | A1* | 7/2020 | el Kaliouby | G06K 9/00302 |
| 2021/0058351 | A1* | 2/2021 | Viklund | H04L 51/18 |
| 2021/0096729 | A1 | 4/2021 | Dalonzo et al. | |
| 2021/0209308 | A1* | 7/2021 | Kang | G06F 3/04817 |
| 2021/0264502 | A1* | 8/2021 | Mozafarian | G06Q 50/12 |
| 2021/0312140 | A1* | 10/2021 | Levkovitz | G06F 16/906 |
| 2021/0382590 | A1* | 12/2021 | Fong | G06Q 50/01 |
| 2022/0070125 | A1 | 3/2022 | Vasamsetti et al. | |
| 2022/0109646 | A1 | 4/2022 | Lakshmipathy | |

OTHER PUBLICATIONS

International Search Report and Written Opinion for International Application No. PCT/US2022/024734, dated Jul. 26, 2022 (Jul. 26, 2022)—10 pages.

International Search Report and Written Opinion for International Application No. PCT/US2022/024554, dated Jul. 26, 2022 (Jul. 26, 2022)—10 pages.

Author, et al.: "Automatically Emoji Generation System Through Social Interactions" 2019, IP.com, 6 pages.

International Search Report and Written Opinion for International Application No. PCT/US2022/024741, dated Aug. 1, 2022 (Aug. 1, 2022)—10 pages.

Arifiyanti et al., Emoji and Emoticon in Tweet Sentiment Classification, 2020, IEEE, 6 pages.

Jiang et al., automatic Prediction and Insertion of Multiple Emojis in Social Media Text, 2020, IEEE, 8 pages.

Yokoi et al., Emoticon Extraction Method Based on Eye Characters and Symmetric String, 2015, IEEE, 6 pages.

* cited by examiner

EMOJI-FIRST MESSAGING

TECHNICAL FIELD

The present subject matter relates to electronic devices and, more particularly, to using emojis in communications between electronic devices.

BACKGROUND

Textual communication is a common means of communication between users of electronic devices (e.g., texting). Textual communication is conventionally performed using standardized computer fonts. Emojis can be used in text communications to enhance communications between the users.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

One aspect of the present disclosure describes use of emoji-first messaging. Text messaging is automatically converted to emojis by an emoji-first application so that only emojis are communicated from one client device to another client device. Each client device has a library of emojis that are mapped to words, which libraries are customizable and unique to the users of the client devices, such that the users can communicate secretly in code. Upon receipt of a string of emojis, a user can select the emoji string, such as by tapping it, to convert to text if desired, for a predetermined period of time. This disclosure provides a more engaging user experience.

The description that follows includes systems, methods, techniques, instruction sequences, and computing machine program products illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

Figure 1:
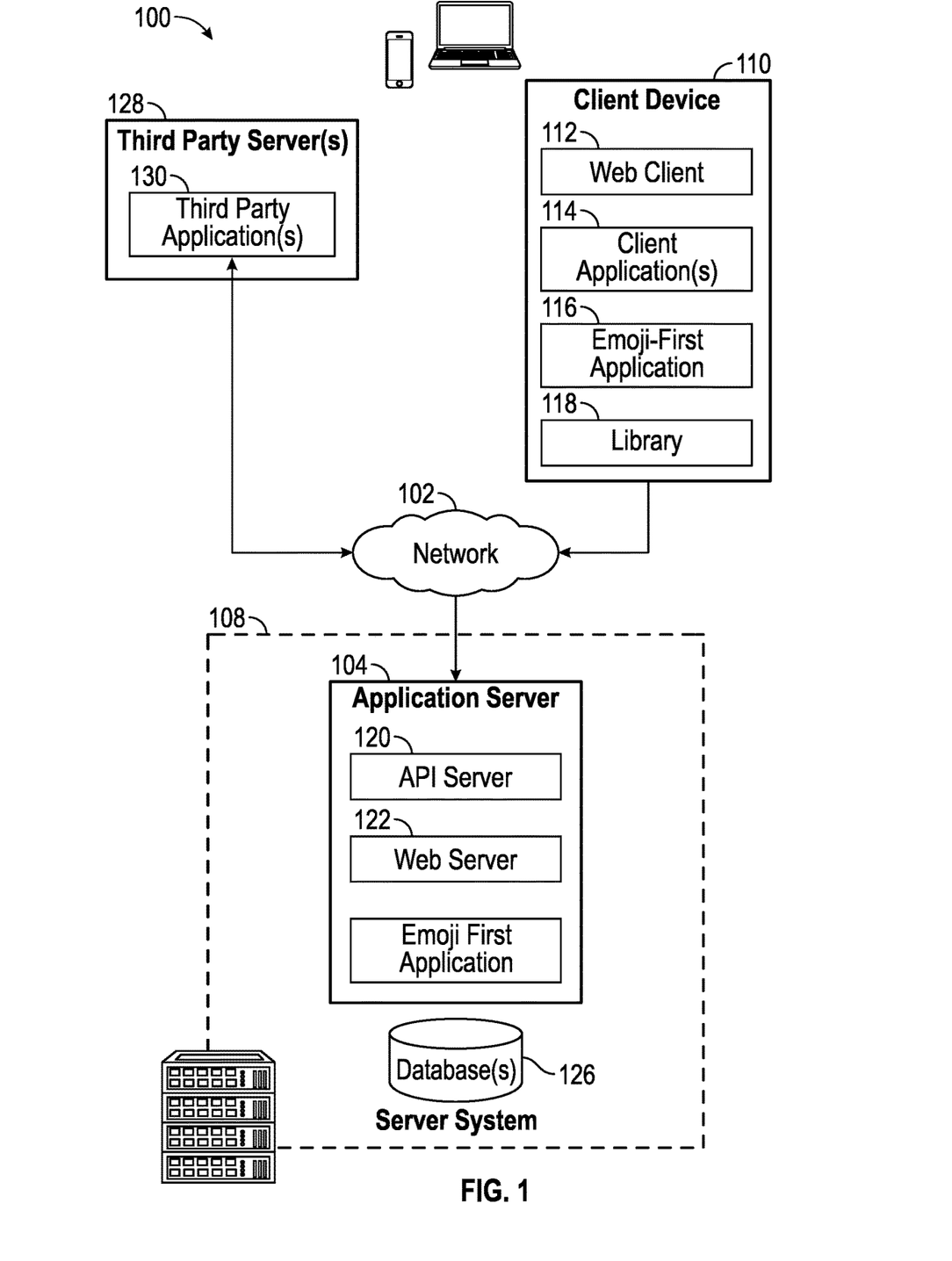
FIG. 1 is a block diagram illustrating a system configured to communicate with emojis first, and also with personalized emoji mapping as expressed in each of a pair of client devices shared libraries.

FIG. 1 is a block diagram illustrating a system 100, according to some examples, configured to enable users of client devices to communicate with one another using only emojis, referred to in this disclosure as emoji-first messaging. Text created by users is automatically converted to emojis based on customizable libraries. The system 100 includes two or more client devices 110. The client device 110 includes, but is not limited to, a mobile phone, eyewear, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. The client devices 110 include a display displaying information, e.g., in the form of user interfaces. In further examples, the client device 110 includes one or more of touch screens, accelerometers, gyroscopes, cameras, microphones, global positioning system (GPS) devices, and so forth. The client device 110 may be a device of a user that is used to access and utilize an online social platform.

For example, client device 110 is a device of a given user who uses a client application 114 on an online social platform, a gaming platform, and communication applications. Client device 110 accesses a website, such as an online social platform hosted by a server system 108. The user inputs login credentials associated with the user. Server system 108 receives the request and provides access to the online social platform.

A user of the client device 110 launches and engages a client application 114 hosted by the server system 108, which in one example is a messaging application. The client device 110 includes an emoji-first module 116 including a processor running client code for performing the emoji-first messaging on the client device 110. The emoji-first module 116 automatically converts text words entered by a user on a client device 110 to generate a string of one or more emojis based on a customizable library 118. The library 118 contains a list of emojis matched to one or more words of text. The messaging client application 114 communicates the emoji string between client devices 110. When a user of another client device 110 having the same customizable library 118 receives the generated emoji string, it displays the string of emojis on a device display, and the user can optionally select converting the received string of emojis to text, such as by tapping on the emoji string.

One or more users may be a person, a machine, or other means of interacting with the client device 110. In examples, the user may not be part of the system 100 but may interact with the system 100 via the client device 110 or other means. For instance, the user may provide input (e.g., touch screen input, alphanumeric input, verbal input, or visual input) to the client device 110 and the input may be communicated to other entities in the system 100 (e.g., third-party servers 128, server system 108, etc.) via a network 102 (e.g., the Internet). In this instance, the other entities in the system 100, in response to receiving the input from the user, may communicate information to the client device 110 via the network 102 to be presented to the user. In this way, the user interacts with the various entities in the system 100 using the client device 110.

One or more portions of the network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a 4G LTE network, another type of network, or a combination of two or more such networks.

The client device 110 may access the various data and applications provided by other entities in the system 100 via a web client 112 (e.g., a browser) or one or more client applications 114. The client device 110 may include one or more client application(s) 114 (also referred to as "apps") such as, but not limited to, a web browser, messaging application, multi-player gaming application, electronic mail (email) application, an e-commerce site application, a mapping or location application, and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

The server system 108 provides server-side functionality via the network 102 (e.g., the Internet or wide area network (WAN)) to: one or more third party server(s) 128, and one or more client devices 110. The server system 108 includes an application server 104 including an application program interface (API) server 120, a web server 122, and one or more personalized font modules 124, that may be communicatively coupled with one or more database(s) 126. The one or more database(s) 126 may be storage devices that store data related to users of the server system 108, applications associated with the server system 108, cloud services, and so forth. The one or more database(s) 126 may further store information related to third-party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with a cloud-based application, in one example.

The emoji-first module 116 is stored on the client device 110 and/or server 108 to optimize processing efficiency. In some examples, all modules for performing a specific task are stored on the device/server performing that action. In other examples, some modules for performing a task are stored on the client device 110 and other modules for performing that task are stored on the server 108 and/or other devices. In some examples, modules may be duplicated on the client device 110 and the server 108.

The one or more third-party application(s) 130, executing on third-party server(s) 128 may interact with the server system 108 via API server 120 via a programmatic interface provided by the API server 120. For example, one or more of the third-party applications 130 may request and utilize information from the server system 108 via the API server 120 to support one or more features or functions on a website hosted by the third party or an application hosted by the third party. The third-party application(s) 130, for example, may provide software version analysis functionality that is supported by relevant functionality and data in the server system 108.

Figure 2:
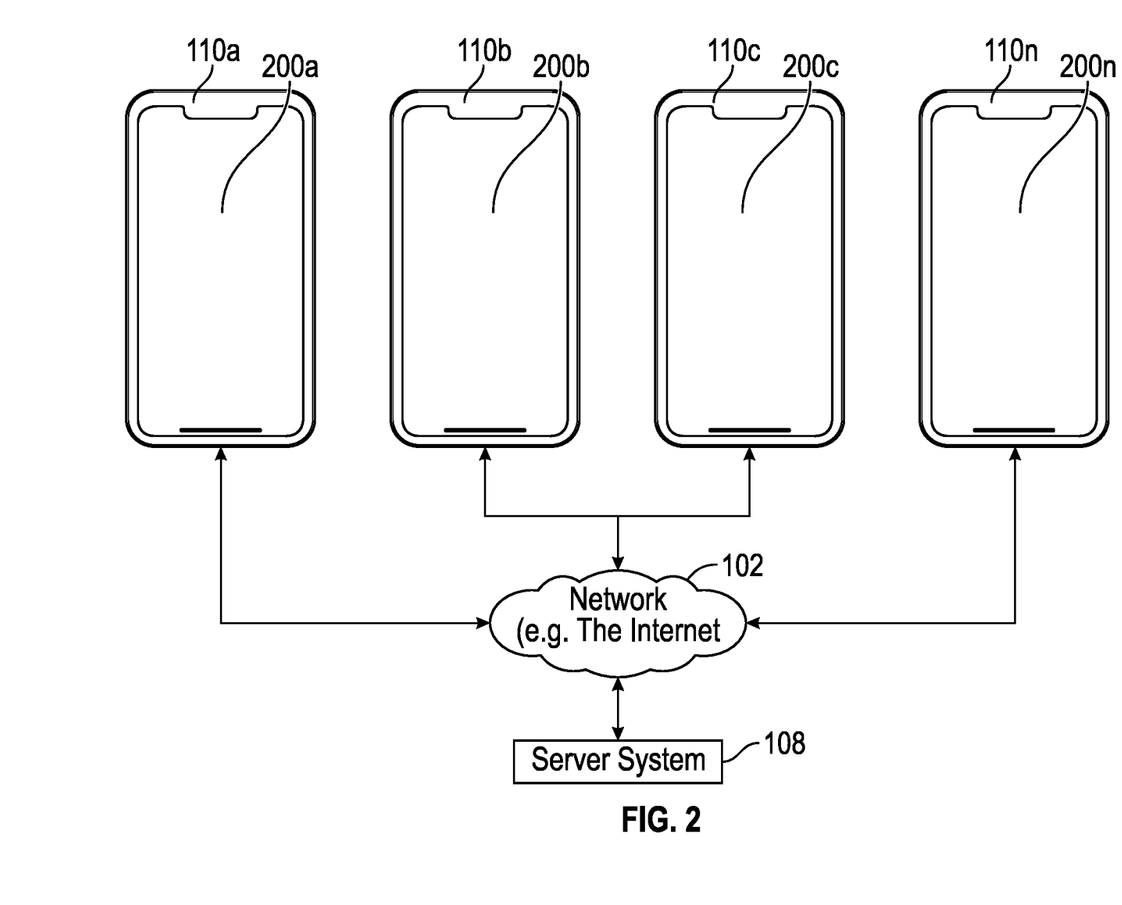
FIG. 2 is a block diagram illustrating communication between client devices with emojis first.

FIG. 2 provides an overview of one example of communicating using the emoji-first module 116 among a plurality of client devices 110a-n using messaging application 114. The client devices 110a-n in FIG. 2 each include the emoji-first module 116 and messaging application 114, and a respective display screen 200a-n configured to display the messaging. The display screen 200a-n is also referred to as a "chat" interface.

Figure 3A:
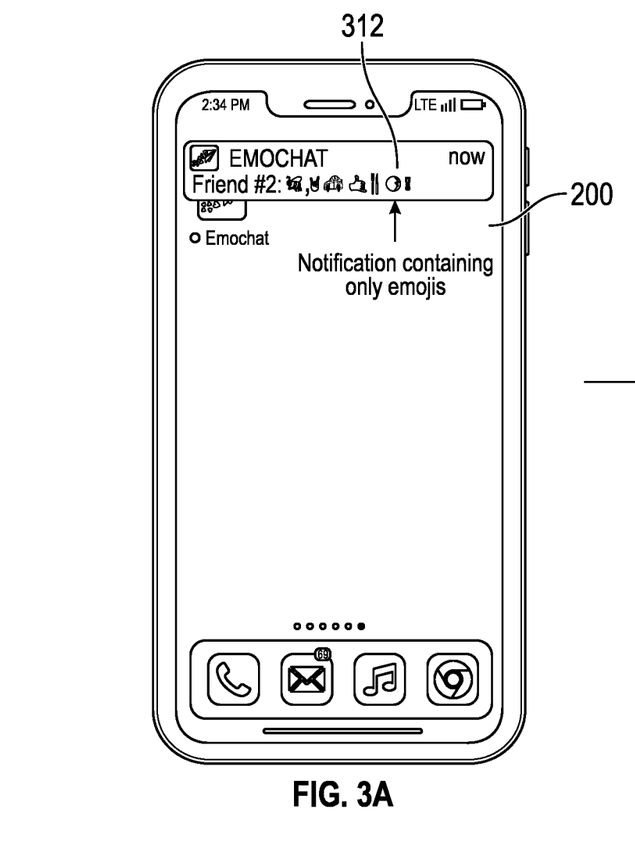
FIG. 3A, FIG. 3B, FIG. 3C and FIG. 3D illustrate emoji-first messaging on a client device.
Figure 3B:
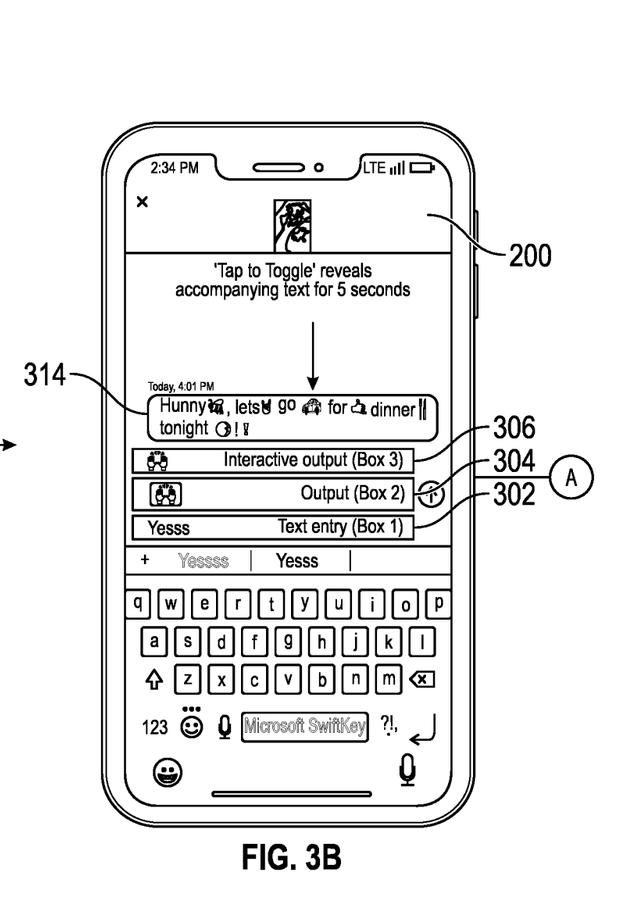
Figure 3C:
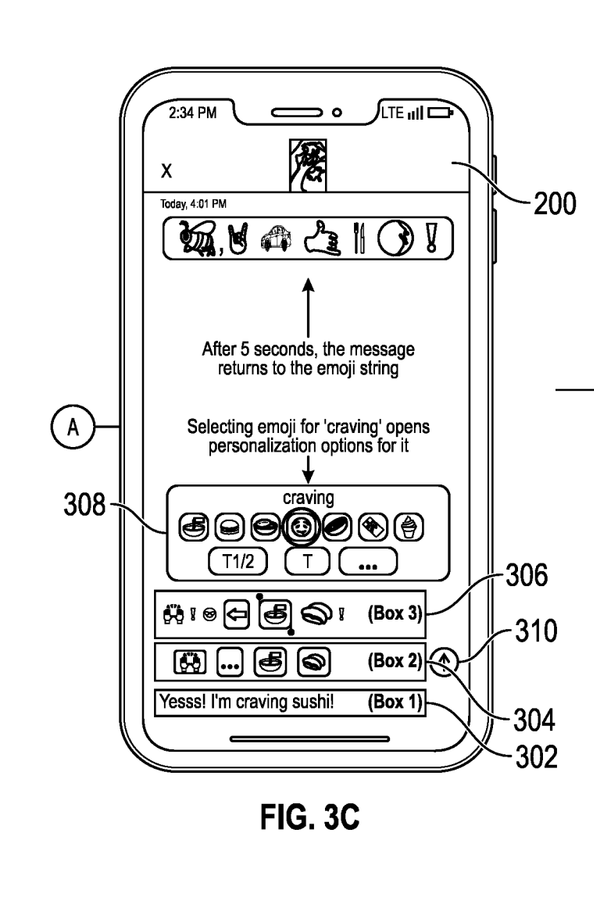

The emoji-first module 116 is an application, such as an iOS app, that enables emoji-first communication between two people in a close relationship, leveraging their closeness and history with each other to foster a shared emoji vocabulary between them. Each user creates an account and specifies a single partner with whom they will use the emoji-first module 116. The chat interface 200 allows the user pair to send and receive emoji-first messages between them, such that the messages comprise of only emojis, such as shown in FIGS. 3A-3D. The emoji-first module 116 automatically and dynamically converts/translates all text into emojis on the fly as the user types, as shown in FIG. 3B, by using automatic text-to-emoji mapping. The users have the option to personalize the emoji-first messages they send by defining their own text-to-emoji mappings, as shown in FIG. 3C, which mappings are stored in library 118. Emojis can be selectively associated with words that are different than the mapping provided by Unicode CLDR data.

The chat interface 200 allows users to exchange emoji-first messages with their partners. That is, the users receive sequences of emoji, referred to as strings, representing a text message without being accompanied by text at first, though they may choose to view the message in text later by tapping the messages. As shown in FIG. 3B and FIG. 3C, the emoji-first messages appear in bubbles, where yellow messages indicate sent, and grey messages indicate received. The user can type, personalize, and preview their message using the three boxes 302, 304 and 306 in the chat interface 200. Once the user is satisfied with a message they have created in the chat interface 200, they can send the message by tapping the send button 310 which is represented by a yellow circle containing an upward arrow. When a message is received, the receiving user only sees the emoji string at first in both the iOS notification 312 in the chat interface 200 as shown in FIG. 3A, and in the chat interface 200 as shown at 314 in FIG. 3B, where the user can tap the emoji string to reveal the fully translated message's corresponding text. Upon tapping, the revealed message will display for a predetermined time, such as 5 seconds in on example, which is helpful to maintain privacy.

Figure 3D:
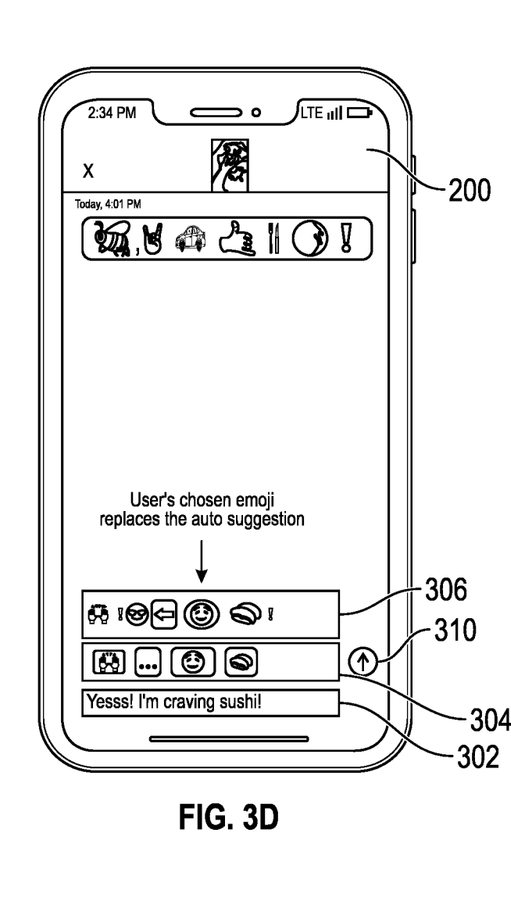
Figure 4:
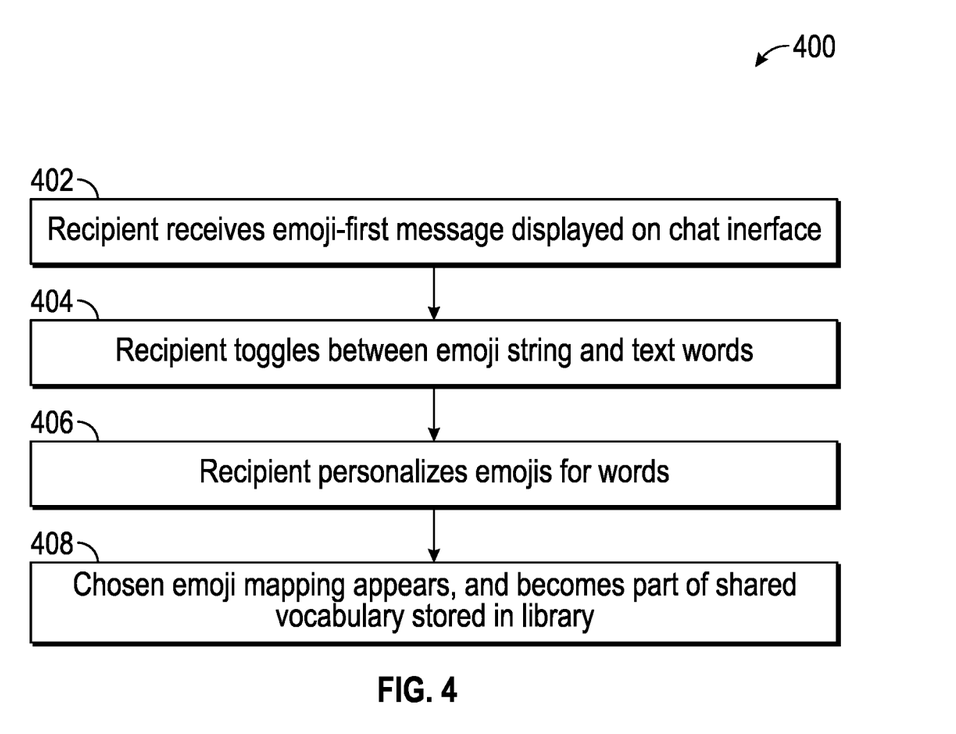
FIG. 4 illustrates a method of operating the emoji-first application on a client device.

Referring to FIG. 4, there is shown a method 400 of operating the emoji-first application 116 on client device 110 in view of FIGS. 3A-3D. The method 400 is performed by a processor of the client device 110, shown as processor 630 in FIG. 6 as will be discussed more shortly.

At block 402, the recipient, referred to as "Friend 1", always sees the received emoji string first, shown as the notification message 312 in FIG. 3A. The notification message 312 from "Friend 2" includes only a string of emojis that are found in the libraries 118 of each client device 110. The emoji-first application 116 sends users standard iOS push notifications whenever the user receives a message from their partner.

At block 404, Friend 1 can long press message 312 from Friend 2 to toggle between the emoji string and text words as shown at 314 in FIG. 3B. The library 118 is used to map the received emojis into words. Responsively, Friend 1 can type a reply to Friend 2 in box 302, and the emoji-first application 116 automatically and fully translates the reply to a string of emojis on the fly as shown in box 304. Box 306 is tappable and allows Friend 1 to modify the automatic mappings. Box 302 is the "main" box that users type into, and they use their client device's standard text-based keyboard to do so. Users can enter emoji here as well through their smartphone's keyboard. Any emoji that are entered directly are transmitted directly and will not be forwarded to the translation process.

At block 406, as shown in FIG. 3C, the word "craving" in box 302 is mapped to a single emoji, indicated by the matching the width of the bubble above this word in box 304. The width (in pixels) of the bubble around each emoji mapping in box 304 matches the width (in pixels) of the corresponding input token from box 302. To personalize the emoji mapping for the word "craving", Friend 1 selects that emoji in box 306 to choose a new mapping for the word "craving." This topmost box 306 acts as a final preview of the emoji message that will be sent, without the artificial spacing between emoji that box 304 shows. Box 306 is also interactive. The user can select substrings of emoji within box 306, as shown in FIG. 3C to open the "personalization menu" in box 308 and replace the emoji substring with their own emoji string mapping. Shown at 308 is a set of possible emojis that are presented to Friend 1, such that Friend 1 can choose from the set to establish the personalized emoji for the word "craving".

At block 408, as shown in FIG. 3D, the chosen emoji mapping now appears in box 306 and becomes part of the pair's shared vocabulary which is stored in library 118. Both friends can view and modify the shared vocabulary in library 118 anytime, thereby providing a personalized and modifiable shared vocabulary.

Figure 5:
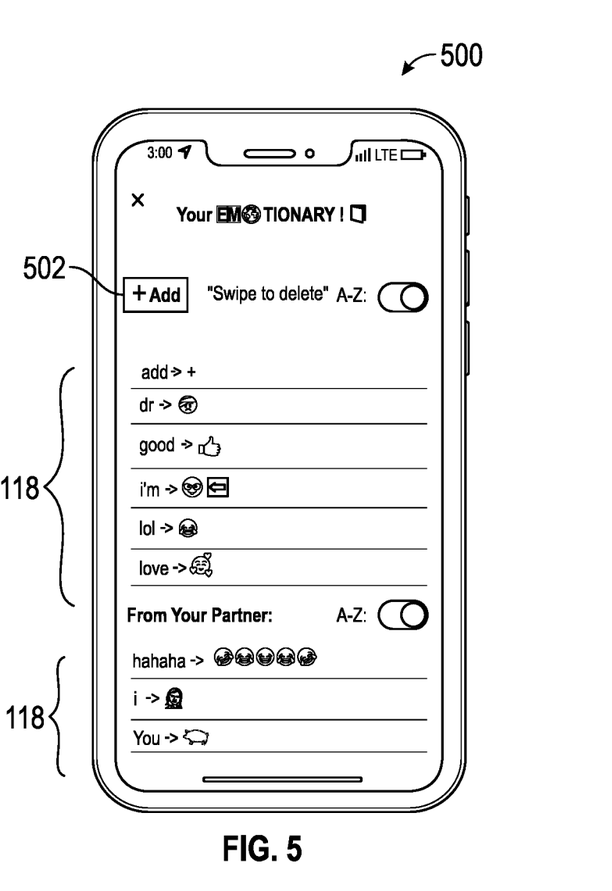
FIG. 5 illustrates a screen showing personalized emoji-first mapping of emojis to words.

Referring to FIG. 5, there is shown an example screen 500 of the chat interface 200 showing library 118 displayed on a client device display 200, referred to in this disclosure as an Emotionary. This screen 500 shows the shared vocabulary of text-to-emoji mappings (from text strings to emoji strings) that a user and their partner has created over time. The library 118 serves as an emoji dictionary that both partners can contribute to and draw from in their communication. The on-the-fly text-to-emoji mapping algorithm 400 of FIG. 4 uses this library 118 as described. There are two portions, the user's text-to-emoji mappings shown on top, and their partner's text-to-emoji mappings shown on bottom. The mappings can be sorted alphabetically or by creation date by the user. Users can add new mappings to the library 118 in two ways. The first way is via the "Add" button 502 on the screen, and the second way is through the display 200 itself, by simply changing any automatically generated text-to-emoji mapping. The combined library 118 allows users to utilize both their and their partner's mappings when typing messages. The emoji-first application 116 prioritizes a user's own library 118 during message translation whenever their partner has a competing mapping.

Figure 6:
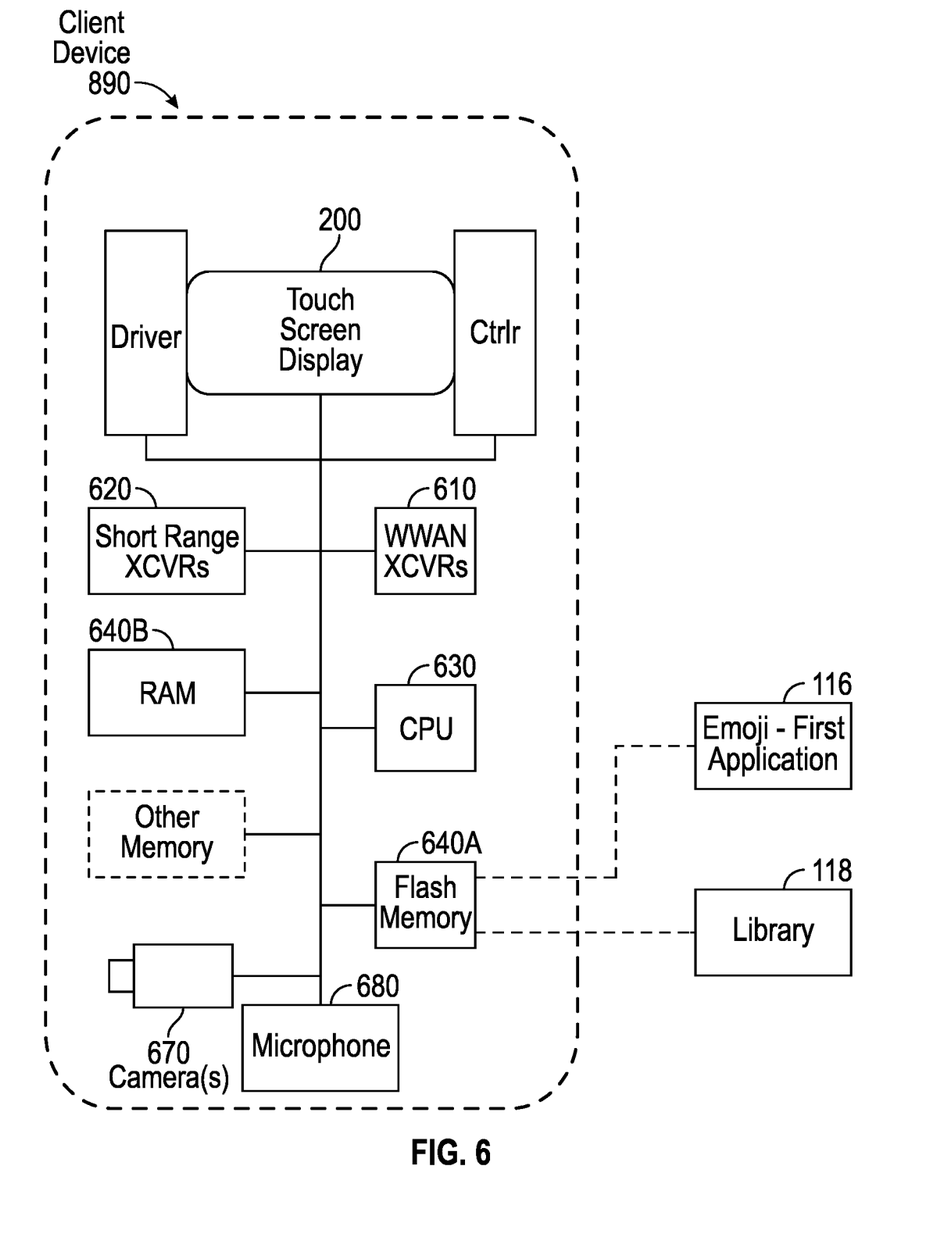
FIG. 6 is a high-level functional block diagram of an example client device comprising a client device that communicates via a network with a server system.

FIG. 6 is a high-level functional block diagram of an example client device 110 including a client device that communicates via network 102 with server system 108 of FIG. 1. Display 200 is a touch screen type display, although other non-touch type displays can be used. Examples of touch screen type client devices 110 that may be used include (but are not limited to) a smart phone, a personal digital assistant (PDA), a tablet computer, a laptop computer, eyewear, or other portable device. However, the structure and operation of the touch screen type client devices is provided by way of example, and the subject technology as described herein is not intended to be limited thereto. For purposes of this discussion, FIG. 6 therefore provides a block diagram illustration of the example client device 110 having a touch screen display for displaying content and receiving user input as (or as part of) the user interface. Client device 110 also includes a camera(s) 670, such as visible light camera(s), and a microphone 680.

The activities that are the focus of discussions here involve the emoji-first messaging, and also the personalized library of emojis that are shared between two users of client devices 110. The emoji-first application 116 and the library 118 may be stored in memory 640 for execution by CPU 630, such as flash memory 640A or RAM memory 640B.

As shown in FIG. 6, the client device 110 includes at least one digital transceiver (XCVR) 610, shown as WWAN XCVRs, for digital wireless communications via a wide area wireless mobile communication network 102. The client device 110 also includes additional digital or analog transceivers, such as short range XCVRs 620 for short-range network communication, such as via NFC, VLC, DECT, ZigBee, BluetoothTM, or WiFi. For example, short range XCVRs 620 may take the form of any available two-way wireless local area network (WLAN) transceiver of a type that is compatible with one or more standard protocols of communication implemented in wireless local area networks, such as one of the Wi-Fi standards under IEEE 802.11, 4G LTE and 5G.

To generate location coordinates for positioning of the client device 110, the client device 110 can include a global positioning system (GPS) receiver (not shown). Alternatively, or additionally, the client device 110 can utilize either or both the short range XCVRs 620 and WWAN XCVRs 610 for generating location coordinates for positioning. For example, cellular network, WiFi, or BluetoothTM based positioning systems can generate very accurate location coordinates, particularly when used in combination. Such location coordinates can be transmitted to the eyewear device over one or more network connections via XCVRs 620.

The transceivers 610, 620 (network communication interface) conforms to one or more of the various digital wireless communication standards utilized by modern mobile networks. Examples of WWAN transceivers 610 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G", and 5G. For example, the transceivers 610, 620 provide two-way wireless communication of information including digitized audio signals, still image and video signals, web page information for display as well as web related inputs, and various types of mobile message communications to/from the client device 110 for user identification strategies.

Several of these types of communications through the transceivers 610, 620 and a network, as discussed previously, relate to protocols and procedures in support of communications with the server system 108 for obtaining and storing friend device capabilities. Such communications, for example, may transport packet data via the short range XCVRs 620 over the wireless connections of network 102 to and from the server system 108 as shown in FIG. 1. Such communications, for example, may also transport data utilizing IP packet data transport via the WWAN XCVRs 610 over the network (e.g., Internet) 102 shown in FIG. 1.

Both WWAN XCVRs 610 and short range XCVRs 620 connect through radio frequency (RF) send-and-receive amplifiers (not shown) to an associated antenna (not shown).

The client device 110 further includes microprocessor 630, shown as a CPU, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 630, for example, may be based on any known or available microprocessor architecture, such as a Reduced Instruction Set Computing (RISC) using an ARM architecture, as commonly used today in client devices and other portable electronic devices. Other processor circuitry may be used to form the CPU 630 or processor hardware in smartphone, laptop computer, and tablet.

The microprocessor 630 serves as a programmable host controller for the client device 110 by configuring the device to perform various operations, for example, in accordance with instructions or programming executable by processor 630. For example, such operations may include various general operations of the client device 110, as well as operations related to emoji-first messaging using emoji-first application 116, and also personalized libraries 118 mapping emojis to text between a two or more users. Although a processor may be configured by use of hardwired logic, typical processors in client devices are general processing circuits configured by execution of programming.

The client device 110 includes a memory or storage device system, for storing data and programming. In the example, the memory system may include a flash memory 640A and a random access memory (RAM) 640B. The RAM 640B serves as short term storage for instructions and data being handled by the processor 630, e.g., as a working data processing memory. The flash memory 640A typically provides longer term storage.

Hence, in the example of client device 110, the flash memory 640A is used to store programming or instructions for execution by the processor 630. Depending on the type of device, the client device 110 stores and runs a mobile operating system through which specific applications, including application 114. Examples of mobile operating systems include Google Android®, Apple iOS® (I-Phone or iPad devices), Windows Mobile®, Amazon Fire OS®, RIM BlackBerry® operating system, or the like.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

What is claimed is:

1. A client device, comprising:
    a user interface configured to allow a user to enter a string of text comprising a message, the user interface configured to display an incoming message from a second client device;
    a memory including a customizable library configured to map the string of text to customized emojis, wherein a user can selectively map the customized emojis to each of a plurality of words to generate the customized library;
    a processor coupled to the memory; and
    instructions stored in the memory that, when executed by the processor, configure the processor to:
        automatically convert the string of text to a string of the customized emojis, such that all the text is automatically converted to the customized emojis to automatically generate the string of customized emojis representing the message without user input;
        send the string of customized emojis representing the message to the second client device;
        share the customizable library with only a selected said second client device to create a private message exchange; and
        toggle a displayed incoming emoji message from the second client device to text and automatically toggle the text back to only emojis after a period of time.

2. The client device of claim 1, wherein the user interface has a portion configured to display a plurality of the customized emojis the user can select to map to a word.

3. The client device of claim 1, wherein the customized library includes the same mapping of words to emojis as a library of the second client device.

4. A method of operating a client device having a user interface configured to allow a user to enter a string of text comprising a message, the user interface configured to display an incoming message from a second client device, a memory including a customizable library configured to map the string of text to customized emojis, wherein a user can selectively map the customized emojis to each of a plurality of words to generate the customized library, a processor coupled to the memory, and instructions stored in the memory configured to be executed by the processor, wherein the processor:

automatically converts the string of text to a string of the customized emojis, such that all the text is automatically converted to the customized emojis to automatically generate the string of customized emojis representing the message without user input;

sends the string of emojis representing the message to the second client device, wherein the processor shares the customized library with only a selected said second client device and creates a private message exchange; and     toggles a displayed incoming emoji message from the second client device to text and automatically toggles the text back to only emojis after a period of time.

5. The method of claim 4, wherein the user interface has a portion configured to display a plurality of the customized emojis the user can select to map to a word.

6. The method of claim 4, wherein the customized library includes the same mapping of words to emojis as a library of the second client device.

7. A non-transitory computer-readable medium storing program code which, when executed, is operative to cause an electronic processor of a client device including a customizable library configured to map a string of text to customized emojis and convert the customized emojis to text, wherein a user can selectively map the customized emojis to each of a plurality of words to generate the customized library, to perform the steps of:

using the customized library to automatically convert a string of text comprising a message to a customized string of emojis, such that all the text is automatically converted to the string of customized emojis to automatically generate the string of customized emojis representing the message without user input;

sending the string of customized emojis representing the message to a second client device, wherein the customized library is shared with only a selected said second client device and creates a private message exchange; and     toggling a displayed incoming emoji message from the second client device to text and automatically toggling the text back to only emojis after a period of time.

\* \* \* \* \*